United States Patent Office 3,549,725
Patented Dec. 22, 1970

3,549,725
THERMOPLASTIC COMPOSITIONS
John Brewster Rose, St. Albans, and Carl Fraser Mathews, Eric Nield, and Peter Incledon Vincent, Ware, England, assignors to Imperial Chemical Industries Limited, London, England, a corporation of Great Britain
No Drawing. Original application Apr. 4, 1966, Ser. No. 539,738. Divided and this application July 17, 1969, Ser. No. 842,708
Claims priority, application Great Britain, Apr. 9, 1965, 15,191/65; Jan. 12, 1966, 1,423/66
Int. Cl. C08f 18/40, 29/52
U.S. Cl. 260—876     7 Claims

ABSTRACT OF THE DISCLOSURE

Graft copolymers comprising a substrate of a diene rubber and a superstrate containing a high proportion of copolymerized acrylontirile together with an ester of acrylic or methacrylic acid. The graft copolymers are useful in blends of acrylonitrile copolymers.

---

This is a division of our prior U.S. patent application, Ser. No. 539,738, filed Apr. 4, 1966.

This invention relates to thermoplastic compositions derived from a diene rubber and a resin, and to the production of shaped articles therefrom.

In particular, it relates to "graft" copolymers comprising a substrate of a diene rubber and a superstrate containing a high proportion of copolymerized acrylonitrile, and to blends of such "graft" copolymers with polymers containing a high proportion of acrylonitrile units. The products of the invention are tough and at the same time rigid and unusually hard.

The superstrate contains a high proportion of acrylonitrile with an ester of acrylic or methacrylic acid and optionally an N-aryl maleimide which may provide at least 1% molar of the units in the superstrate. Aromatically conjugated monomers such as styrene and α-methylstyrene are excluded from the superstrate owing to their normally inhomogeneous copolymerization with acrylontirile. Rubber-free resins from the superstrate monomers are exceptionally strong materials with high softening points, but they are insufficiently tough for many purposes.

The superstrate contains from 45% to 90% (preferably 60% to 84%) molar of units from acrylonitrile, from 0% to 20% (preferably not more than 10%) molar of units from at least one N-aryl maleimide, and from 5% to 35% (preferably 15% to 30%) molar of units from said ester of acrylic or methacrylic acid.

The N-aryl maleimides are conveniently obtained from anilines (primary arylamines). Many different anilines are readily available and yield N-aryl maleimides that may be used as comonomers for the copolymers. The aryl substituent is derived from an aromatic hydrocarbon or heterocycle in which one or more of the hydrogen atoms may be replaced by other atoms or groups. Substituents containing active hydrogen atoms, however, are generally to be avoided because they may interfere with polymerizations catalysed by free radicals. The aryl groups that may be present in the N-aryl maleimides include, for example phenyl, 4-diphenyl, 1-naphthyl, all the mono- and di-methylphenyl isomers, 2,6-diethylphenyl, 2-, 3- and 4-chlorophenyl, 4-bromophenyl and other mono- and di-halophenyl isomers, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl and methylchlorophenyl (2,3-, 2,4-, 2,5- and 4,3-isomers). The N-(o-substituted phenyl) maleimides are generally less colored than the other isomers or the unsubstituted compounds and may therefore be preferred if a relatively colorless product is desired.

The other ethylenically unsaturated monomer is an ester of acrylic acid or methacrylic acid such as methyl, ethyl, n-butyl and 2-ethylhexyl acrylates and methyl and n-butyl methacrylates.

The diene rubber in the substrate contains from 40% to 100% molar of at least one conjugated 1,3-diene monomer and from 0% to 60% of at least one other ethylenically unsaturated monomer copolymerizable with free-radical catalysts. Suitable dienes include for example, butadiene, isoprene, 2,3-dimethylbutadiene, piperylene and chloroprene. As comonomers acrylonitrile and styrene are particularly convenient, although a wide variety of other monomers may be used, including many of those listed above as examples of ethylenically unsaturated comonomers for the superstrate herein and in Ser. No. 539,738, the disclosure of which is incorporated herein by reference. Diene homopolymers (e.g. polybutadiene) and copolymers with a low proportion of comonomer have lower glass transition temperatures and may therefore be preferable especially when the product is required for service at low temperatures.

The compositions of the invention can be produced by a process comprising sequential polymerization. In this process, the monomers for the superstrate are polymerized by free-radical catalysis in the presence of the diene rubber. The process is carried out using the appropriate techniques for polymerizations catalyzed by free radicals, conveniently in bulk or in aqueous suspension or emulsion. A similar emulsion process or a stereospecific process may be used to make the diene rubber. The "graft" copolymer may then be employed as a latex or isolated from the polymerization medium, freed from residual monomers, and dried. The product of this sequential polymerization may be blended if desired with a resin, e.g. a resin formed from the superstrate monomers as described herein or in Ser. No. 539,738, the disclosure of which is incorporated herein by reference. This blending step can be used to produce tough and strong compositions. The grafts are therefore, according to the invention, useful materials for blending with resins to give tough compositions. The resin used for blending is not necessarily one made from the same monomers as the "grafted" portion but can be any resin of adequate strength especially one having a high content of nitrile groups. This may be for example a copolymer of acrylonitrile (45% to 90% molar, preferably 60% to 84% molar) with at least one other copolymerizable ethylenically unsaturated monomer, e.g. a homogeneous copolymer with a conjugated aromatic olefine.

A product in many ways equivalent to such a blend may also be obtained directly by adjusting the conditions of the "grafting" polymerization so that some of the superstrate monomers copolymerize to give some separate resin as well as the "graft."

The resultant products are thus composed at least partially of the type of material usually referred to as "graft copolymer." It is possible, however, that the superstrate in the "grafted" material is not all chemically bonded to the rubber but contains resin from the superstrate monomers associated with the rubber in a much more intimate physical mixture than can normally be obtained by blending preformed polymers.

The amount of rubber in the final blend is not the only factor governing toughness, which depends also on the amount of resin "grafted" onto the rubber in the "graft" used for blending.

Preferably the blend comprises from 1% to 50% by weight of the diene rubber. Compositions containing below 25% of the rubber are particularly hard scratch-resistant materials with high impact strength, and while there is an apparently smooth transition of properties the compositions containing at least 20% (preferably not more than 40%) of the rubber tend to be hard materials with very high impact strength.

Preferred blends according to the invention, unlike some rubber/resin blends, show no apparent separation of phase on warming from −180° C. to +20° C.

The compositions of the invention, mixed with any desired fillers or reinforcing materials, lubricants and stabilizers, can be used as thermoplastic raw materials to make articles which require a good resistance to impact. Their toughness coupled with high strength and high softening point may thus be displayed to advantage. For example, the compositions may be extruded into sheet or tube, and the sheet can be calendered with embossing if desired or can be shaped as required, e.g. by pressing drawing or vacuum-forming. The compositions can also be compression-molded and injection-molded. Examples of articles that may thus be produced using the compositions of the invention include panelling and exterior casing for machinery (as in motor cars, office machines and household equipment), crash helmets, pipes for conveying fluids, and telephone receivers. The use of compositions of the invention having superior tensile strength coupled with rigidity and toughness may allow economy of material in comparison with currently used products in that thinner pieces would serve the same purpose. The advantageous physical properties of the compositions may also permit them to be used in engineering applications for which plastics have not hitherto been suitable.

The toughness of a material such as a thermoplastic polymer is connected with the amount of energy that the material is capable of absorbing without breaking when stressed in tension, and this in turn is related to the way in which the material behaves when stressed in tension at different temperatures. When an increasing uniaxial tensile stress is applied an any one temperature, the material will eventually either break or yield. The material breaks before yielding if it is brittle, and whether or not it is brittle depends on the temperature. There is a temperature (the "brittle point") peculiar to any particular material above which it eventually yields under tensile stress and below which it undergoes brittle fracture. At temperatures below the brittle point, the amount of energy the material can absorb when stressed in tension is low and varies little with temperature. Above the brittle point, however, the amount of energy that can be absorbed rises steeply as the temperature increases. To be tough at room temperature, therefore, a material should have a relatively low brittle point.

The brittle points of two different materials can be compared indirectly by comparing their properties under stress, first at a low temperature where both materials are brittle, and secondly at a higher temperature where neither material is brittle. Convenient temperatures for these tests are obtained by using liquid nitrogen (the sample being at about −180° C.) and room temperature (+20° C.) respectively. Up to its brittle point, the stress at which a material breaks falls only slightly as the temperature increases. Above the brittle point, however, the stress at which the material yield falls relatively steeply as the rise of temperature continues. Consider therefore two materials which break at the same stress at −180° C. but have different brittle points. The material with the lower brittle point (the tougher material) will yield at the lower stress at +20° C. Conversely, the tougher of two different materials yielding at the same stress at +20° C. will be the one which breaks at the higher stress at −180° C.

In order to toughen a material, therefore, it is desirable to alter its composition so as to preserve a high resistance to brittle fracture at −180° C. but reduce the stress at which it yields at +20° C.

Resins containing a high proportion of homogeneously copolymerized acrylonitrile have unusually high breaking stresses at −180° C. and high yielding stresses at +20° C. According to the invention it has been found that "graft" copolymers and their blends may be produced so as largely to retain the high breaking stress at −180° C. but having a reduced yielding stress at +20° C. Owing to the high breaking stress at −180° C., the yielding stress at +20° C. can be reduced sufficiently for the product to become tough while remaining adequately rigid and hard. The invention accordingly provides materials which have a good resistance to impact coupled with excellent structural properties.

The breaking stress at −180° C. was measured on specimens 51 mm. long and 12.7 mm. wide milled from a compression-molded sheet 3 mm. thick. The specimen rested on two supports 38.1 mm. apart and midway between them a load was applied sufficient to bend the specimen at the rate of 457 mm./min. The breaking stress was calculated by multiplying the load at the moment of rupture by the factor:

$$(1.5)(38.1)/(12.7)(3)^2 = 0.5$$

The yielding stress at +20° C. was measured on specimens 76 mm. long and 14 mm. wide milled from a compression-molded sheet 3 mm. thick. The cross-sectional area across the center of the specimen was reduced to 9 mm.$^2$ by milling two slots (radius of curvature 31 mm.) opposite each other in the long edges so that the narrowest width of the specimen was 3 mm. A tensile stress was then applied to the specimen sufficient to elongate it at the rate of 12.7 mm./min. and the stress at the yield point was recorded.

For comparison with the data of the examples below, the flexural breaking stress at −180° C. of the rubber-free resins formed from the superstrate monomers is usually about 25 kg./mm.$^2$ and the tensile yielding stress is usually about 11 kg./mm.$^2$. The compositions of the invention often largely retain the high breaking stress at −180° C. characteristic of the resins but have improved toughness (as may be indicated by the greatly reduced yielding stress).

As explained above, a useful indication of the relative toughness of materials is often given by comparing their flexural breaking stresses at −180° C. and their tensile yielding stresses at +20° C. With materials that are so tough as not to be brittle in the tensile test at −40° C., however, this approach loses some of its value. An additional test (the "notched specimen impact test") has therefore been used to supplement the comparative measurements on such materials.

In this test, a specimen 60 mm. long, 6.5 mm. wide and 3 mm. thick was given a 45° notch 2.8 mm. deep (tip radius not more than 0.25 mm.) in the center of one edge. It was supported between two supports 50 mm. apart and struck centrally on the edge opposite the notch by a pendulum dropping from 30 cm. with more than sufficient energy to break the specimen. From the residual energy of the pendulum the energy required to break the specimen was calculated and divided by the cross-sectional area of the specimen at the notch. The resulting value (expressed in joules/cm.$^2$) represented the energy required to cause cracks to propagate in the material.

Using this test at room temperature (20–26° C.), various "ABS" materials broke at 0.5 j./cm.$^2$ or somewhat above. Compositions of the invention have been found to have similar "toughness" in this test; for example the products of Example 2 broke at 0.44 j./cm.$^2$. Thus compositions of the invention possess toughness in combination with exceptionally high tensile strength.

The following examples illustrate the invention. "Breaking stress," "yielding stress," and "toughness" were measured as described above. Measurements were made at +20° C. (room temperature) unless otherwise indicated.

EXAMPLE 1

Acrylonitrile (75% molar), N-phenylmaleimide (5% molar) and isobutene (20% molar) monomers were co-polymerized in the presence of a rubber latex, not short-stopped, formed of 30% molar acrylonitrile and 70% molar butadiene and containing 49.4% solids of which 77% was insoluble in methyl ethyl ketone.

The latex (55.85 g.) was brought to pH 5.7 with 0.1 N sulphuric acid and placed in a shaking autoclave. A solution of N-phenylmaleimide (14.25 g.) in acrylonitrile (65.8 g.) was added, together with water (650 cm.$^3$), potassium persulphate (1.55 g.) and sodium metabisulphite (1.03 g.). The contents of the autoclave were repeatedly pressurized to 7 kg./cm.$^2$ with nitrogen and vented. Isobutene (18.8 g.) was then added and the reaction mixture was maintained at 30° C. for 18 hours under nitrogen at 7 kg./cm.$^2$. The solid composition (97.1 g.) was isolated by adding an aqueous solution (10 cm.$^3$) of calcium chloride saturated at room temperature, washing the solid six times with water at 90° C. and then with cold methanol, and drying under vacuum at 70° C. Assuming that the product comprised all the rubber initially employed, it contained 28.4% rubber and 20% butadiene. The full Vicat and one-tenth Vicat softening points of the material were 102° C. and 93° C. respectively.

On compression-molding the composition gave a clear yellow plaque. Its breaking stress at −180° C. and yielding stress at +20° C. were respectively 25 kg./mm.$^2$ and 5.9 kg./mm.$^2$. Similar measurements on commercially available acrylonitrile/butadiene/styrene terpolymers and blends ("ABS" materials) showed breaking stresses at −180° C. of 13 to 17 kg./mm.$^2$ and yielding stresses at +20° C. of 3.9 to 5.6 kg./mm.$^2$.

The melt viscosity of the composition was 12.5 kP. at 260° C., measured at a shear rate of 1000/s. The extrudate was transparent and pale yellow and the melt viscosity remained unchanged over five minutes at 260° C.

EXAMPLE 2

Acrylonitrile (75% molar), N-2-chlorophenylmaleimide (5% molar) and methyl acrylate (20% molar) monomers were copolymerized in the presence of a rubber latex, not short-stopped, formed of 32% molar acrylonitrile and 68% molar butadiene and containing 48.4% solids, as described in Example 1.

The latex (57.06 g.; 27.6 g. solids) was brought to pH 5.7. Acrylonitrile (65.8 g.), N-2-chlorophenyl maleimide (17.1 g.) and methyl acrylate (28.55 g.) were added, together with sodium metabisulphite (0.33 g.), potassium persulphate (0.5 g.) and water (650 cm.$^3$). The polymerization was conducted as described in Example 1 for 21 hours at 30° C. to yield 112 g. solids. The isolated composition contained 24.7% rubber and 16.9% butadiene. On compression-molding at 200° C. it gave a transparent pale yellow plaque. This had a breaking stress at −180° C. of 23.2 kg./mm.$^2$, a yielding stress at +20° C. of 7.2 kg./mm.$^2$, and a melt viscosity of 20 kP. at 260° C. and a shear rate of 1000/s.

EXAMPLE 3

The process described in Example 2 was repeated using 76.5 g. of the latex (37 g. solids). The solid composition (124.2 g.) when isolated contained 29.8% rubber and 20.4% butadiene. On compression-molding at 200° C. it gave a transparent and very pale yellow plaque. This had full and one-tenth Vicat softening points of 95° C. and 85° C. respectively, a breaking stress at −180° C. of 23.3 kg./mm.$^2$, and a melt viscosity of 21 kP. at 260° C. and a shear rate of 1000/s.

EXAMPLE 4

A rubber "graft" for blending with a separately prepared resin was made by copolymerizing acrylonitrile (75% molar), N-phenylmaleimide (5% molar) and isobutene (20% molar) in the presence of a rubber latex not short-stopped formed of 30% molar acrylonitrile and 70% molar butadiene and containing 47.5% solids.

The latex (147.5 g.) was adjusted to pH 5.7 and placed with water (680 cm.$^3$), ammonium persulphate (1.40 g.) and sodium metabisulphite (1.08 g.) in a one-liter shaking autoclave, which was then thrice pressurized to 7 kg./cm.$^2$ with nitrogen and vented. N-phenylmaleimide (10.1 g.) and acrylonitrile (6.15 cm.$^3$) were added, and the autoclave was again thrice pressurized to 7 kg./cm.$^2$ with nitrogen and vented. Finally isobutene (21.9 cm.$^3$) was added and the autoclave was shaken at 30° C. for 18 hours under nitrogen at about 4 kg./cm.$^2$. The product was a white latex containing 13.5% solids of which about 58% was rubber.

This product was blended with a latex of a homogeneously copolymerized copolymer of acrylonitrile (78% molar) and styrene (22% molar) and the blends were coagulated to give strong tough compositions. Their properties are tabulated below.

| | | |
|---|---|---|
| Rubber in blend, percent | 10 | 25 |
| Yielding stress kg./mm.$^2$ | 8.6 | 5.8 |
| Toughness j./cm.$^2$ | 0.4 | 3.2 |
| Vicat softening point: | | |
| Full, degrees centigrade | 106 | 106 |
| $\frac{1}{10}$, degrees centigrade | 100 | 88 |

EXAMPLE 5

The process described in Example 4 was repeated, except that methyl acrylate (22.7 cm.$^3$; 20% molar) was used instead of isobutene and was added to the autoclave with the other monomers. The product was a latex containing 16.3% solids of which about 47% was rubber. The isolated graft had full and one-tenth Vicat softening points of 90° C. and 78° C. respectively and a yielding stress of 2.4 kg./mm.$^2$.

The product was blended as a latex with a latex of an acrylonitrile/styrene copolymer as in Example 4 and the blend coagulated to give a strong tough composition containing 25% rubber having full and one-tenth Vicat softening points of 104° C. and 93° C. respectively, a yielding stress of 5.7 kg./mm.$^2$, and a toughness in the notched specimen impact test of 2.6 j./cm.$^2$.

EXAMPLE 6

Rubber "grafts" were prepared by the process described in Example 4, using the quantities of rubber and monomers tabulated below.

| Starting materials: | | | | | | |
|---|---|---|---|---|---|---|
| Rubber, g | 240 | 166 | 180 | 339 | 140 | 106 |
| Acrylonitrile, g | 72.3 | 72.3 | 147.9 | 224 | 224 | 224 |
| N-phenylmaleimide, g | 15.7 | 15.7 | 30.3 | 45.4 | 45.4 | 45.4 |
| Isobutene, g | 20.4 | 20.4 | 42.3 | 63.5 | 63.4 | 63.5 |
| Water, cm.$^3$ | 2,400 | 1,700 | 2,040 | 2,500 | 2,500 | 2,500 |
| Na$_2$S$_2$O$_5$, g | 1.80 | 1.80 | 4.0 | 6.0 | 6.0 | 6.0 |
| K$_2$S$_2$O$_8$, g | 2.16 | 2.16 | 4.4 | 6.6 | 6.6 | 6.6 |
| Properties of the isolated "grafts": | | | | | | |
| Percent rubber | 91 | 74 | 66 | 53 | 35 | 29 |
| Breaking stress, kg./mm.$^2$ | 0.3 | 0.5 | 1.6 | | | |
| Yielding stress, kg./mm.$^2$ | | | | 2.4 | 4.1 | 5.0 |

These "grafts" as latices were blended with the latex of a resin made by a process generally similar to that of Example 4 (but omitting the rubber) from acrylonitrile (1750 cm.$^3$), N-penylmaleimide (304.5 g.), isobutene (655 cm.$^3$), sodium metabisulphite (10.37 g.), ammonium persulphate (12.5 g.), sodium dodecyl sulphate (12.25 g.) and octanethiol (5.6 cm.$^3$). This resin when isolated had a reduced viscosity of 1.0 at 0.5% in dimethylformamide at 25° C. The amount of the resin added to each of the "grafts" was such that all the final blends contained 20% by weight of rubber. The products were isolated using 0.75% aqueous calcium chloride, washed and dried. Their properties are tabulated below.

| Rubber in "graft" by weight, percent | 91 | 74 | 66 | 53 | 35 | 29 |
|---|---|---|---|---|---|---|
| Yielding stress, kg./mm.$^2$ | 6.1 | 5.6 | 7.7 | 7.4 | 7.0 | 6.9 |
| Toughness, j./cm.$^2$ | 0.23 | 0.61 | 0.65 | 1.02 | 0.58 | 0.60 |

Outstanding toughness is shown by the blend made with the "graft" containing 53% of rubber.

EXAMPLE 7

A rubber "graft" for blending with a separately prepared resin was made by copolymerizing acrylonitrile (80% molar) and methyl acrylate (20% molar) in the presence of a rubber latex not short-stopped formed from 30% molar acrylonitrile and 70% molar butadiene and containing 47.5% solids.

The latex (126.4 g.) was adjusted to pH 5.7 and placed with water (600 cm.$^3$), ammonium persulphate (1.20 g.) and sodium metabisulphite (0.99 g.) in a one-liter shaking autoclave, which was then thrice pressurized to 7 kg./cm.$^2$ with nitrogen and vented. Acrylonitrile (53.0 cm.$^3$) and methyl acrylate (18.1 cm.$^3$) were added, and the autoclave was again thrice pressurized to 7 kg./cm.$^2$ with nitrogen and vented. The autoclave was shaken at 30° C. for 16 hours under nitrogen at about 1.6 kg./cm.$^2$. The product contained 61% of rubber.

A sample of the "graft" latex was coagulated using 0.75% aqueous calcium chloride to give a polymer which was washed twice with water and twice with methanol and dried and then gave transparent yellow moldings at 200° C.: full Vicat softening point 65° C.; toughness 1.63 j./cm.$^2$.

The "graft" latex was blended with the latex of a resin made by a process generally similar to that of Example 5 but from acrylonitrile (75% molar), N-phenylmaleimide (5% molar) and methyl acrylate (20% molar). The amount of the resin latex added was such that the resulting blend contained 10% of rubber. The product was isolated using 0.75% aqueous calcium chloride and washed and dried. It gave transparent yellow moldings at 200° C.: full Vicat softening point 94° C.; yielding stress 8.3 kg./mm.$^2$; toughness 2.10 j./cm.$^2$.

EXAMPLE 8

A rubber "graft" for blending with a separately prepared resin was made by copolymerizing acrylonitrile (75% molar), N-phenylmaleimide (5% molar) and methyl acrylate (20% molar) in the presence of a polybutadiene latex containing 39.5% solids.

The latex (177.2 g.) was placed with water (680 cm.$^3$) and ammonium persulphate (1.40 g.) in a one-liter shaking autoclave which was then thrice pressurized to 7 kg./cm.$^2$ with nitrorgen and vented. Acrylonitrile (61.5 cm.$^3$), N-phenylmaleimide (10.1 g.) and methyl acrylate (22.7 cm.$^3$) were added and the autoclave was again thrice pressurized to 7 kg./cm.$^2$ with nitrogen and vented. The autoclave was shaken at 60° C. for 17 hours under nitrogen at 1.0 to 1.8 kg./cm.$^2$. The resulting latex contained 15.7% solids of which 47% was rubber.

A sample of the "graft" isolated as in Example 7 gave transparent brown moldings at 200° C.: full and one-tenth Vicat softening points 89° C. and 78° C. respectively; yielding stress 2.0 kg./mm.$^2$.

The "graft" latex was blended with the latex of an acrylonitrile/N-phenylmaleimide/methyl acrylate resin as described in Example 7 to give blends containing 10% and 20% of rubber, which were isolated as before. Their properties are tabulated below.

| Percent rubber in blend | 10 | 20 |
|---|---|---|
| Yielding stress, kg./mm.$^2$ | 9.1 | 7.3 |
| Toughness, j./cm.$^2$ | 0.25 | 0.95 |

EXAMPLE 9

Rubber "grafts" were made as described in Example 8 but using 0.5 cm.$^3$, 0.96 cm.$^3$ and 1.93 cm.$^3$ octanethiol in the polymerization mixture. The "graft" latices were blended with the latex of an acrylonitrile/N-phenylmaleimide/isobutene resin as described in Example 6 to give products containing 10% and 20% of rubber. The properties of the "grafts" and blends, isolated as before, are tabulated below.

| Octanethiol used, cm.$^3$ | 0.5 | 0.96 | 1.93 |
|---|---|---|---|
| "Grafts": | | | |
| Full Vicat softening point, degrees centigrade | 93 | 96 | 91 |
| 1/10 Vicat softening point, degrees centigrade | 83 | 85 | 80 |
| Yielding stress, kg./mm.$^2$ | 3.1 | 3.1 | 2.8 |
| Percent of rubber by weight | 48 | 48 | 48 |
| Blends containing 10% of rubber: | | | |
| Yielding stress, kg./mm.$^2$ | 10.0 | 10.0 | 9.5 |
| Toughness j./cm.$^2$ | 0.14 | 0.07 | 0.16 |
| Blends containing 20% of rubber: | | | |
| Yielding stress, kg./mm.$^2$ | 8.1 | 8.0 | 7.7 |
| Toughness j./cm.$^2$ | 0.61 | 0.63 | 0.67 |

EXAMPLE 10

A polybutadiene latex (184 g.; 70 g. solids), water (650 cm.$^3$), ammonium persulphate (1.4 g.), acrylonitrile (79.9 cm.; 1.2 mole) and methyl acrylate (27.1 cm.$^3$; 0.3 mole) were polymerized under nitrogen in a one-liter shaking autoclave for 16 hours at 80° C. The resulting "graft" latex contained 16.6% solids of which 45.7% was rubber. This was latex-blended with a homogeneously copolymerized acrylonitrile/styrene latex (molar ratio 78:22, reduced viscosity 0.86 at 0.5% in dimethylformamide at 25° C.) to give a tough strong blend containing 20% of rubber.

What is claimed is:

1. A graft copolymer comprising (i) a substrate of a diene rubber containing 40% to 100% molar of at least one conjugated 1,3-diene monomer and from 0% to 60% molar of at least one other ethylenically unsaturated monomer copolymerizable therewith using free radical catalysts and (ii) a superstate which contains from 45% to 90% molar of units from acrylonitrile, from 1% to 20% molar of units from at least one N-aryl maleimide and from 5% to 35% molar of units from at least one ester selected from the esters of acrylic and methacrylic acids.

2. A graft copolymer according to claim 1 in which the superstrate contains from 60% to 84% molar of units from acrylonitrile.

3. A graft copolymer according to claim 1 in which the superstrate contains from 1% to 10% molar of units from N-aryl maleimide.

4. A graft copolymer according to claim 1 in which the superstrate contains from 15% to 30% molar of units from the esters selected from the esters of acrylic and methacrylic acids.

5. A graft copolymer according to claim 1 in which the diene rubber substrate is polybutadiene.

6. A blend of a graft copolymer according to claim 2 and a resin containing 60% to 84% molar of units from acrylonitrile, 40% to 16% molar of units from at least one ethylenically unsaturated comonomer selected alkenes, dienes, esters of acrylic and methacrylic acids, vinyl esters, vinyl ethers, esters of fumaric acid, unsaturated nitriles, vinyl chloride, vinylidene chloride and α-chloroacrylonitrile, and 0% to 20% molar of units from at least one N-aryl maleimide, the blend containing from 1% to 50% by weight of rubber.

7. A blend of a graft copolymer according to claim 2 and a homogeneously copolymerized resin containing 60% to 84% molar of units from acrylonitrile, 40% to 16% molar of units from at least one conjugated aromatic olefine, and 0% to 20% molar of units from at least one N-aryl maleimide, the blend containing from 1% to 50% by weight of rubber.

References Cited
UNITED STATES PATENTS

| | | | |
|---|---|---|---|
| 3,262,993 | 7/1966 | Hagemeyer et al. | 260—879 |
| 3,264,234 | 8/1966 | Osmond | 260—879 |
| 3,265,708 | 8/1966 | Stiteler | 260—879 |
| 3,322,852 | 5/1967 | Trementozzi et al. | 260—879 |
| 3,352,832 | 11/1967 | Barr et al. | 260—78U |

MURRAY TILLMAN, Primary Examiner

H. ROBERTS, Assistant Examiner

U.S. Cl. X.R.

260—29.7, 78, 879